United States Patent [19]

Pitts

[11] 4,100,252

[45] Jul. 11, 1978

[54] METAL EXTRACTION PROCESS

[75] Inventor: Frank Pitts, Madrid, Spain

[73] Assignee: Engelhard Minerals & Chemicals Corporation, Edison, N.J.

[21] Appl. No.: 781,753

[22] Filed: Mar. 28, 1977

[30] Foreign Application Priority Data

Apr. 26, 1976 [GB] United Kingdom ............... 16846/76

[51] Int. Cl.² ............................................. C01G 31/00
[52] U.S. Cl. ....................................... 423/68; 423/65; 423/82; 423/62
[58] Field of Search ................... 423/62, 63, 67, 68, 423/82; 75/101 R, 115

[56] References Cited

U.S. PATENT DOCUMENTS

| | | | |
|---|---|---|---|
| 3,625,645 | 12/1971 | Feriero et al. | 423/62 |
| 3,754,072 | 8/1973 | Sato et al. | 423/62 |
| 3,975,495 | 8/1976 | Bowerman | 423/65 |

Primary Examiner—Herbert T. Carter
Attorney, Agent, or Firm—Inez L. Moselle

[57] ABSTRACT

The present invention provides a method for recovering vanadium, niobium, tantalum and zirconium from vanadiferous residues arising from the chlorination of titaniferous ores. Such residues contain chlorides of these metals and/or titanium, aluminum, iron, chromium and manganese together with carbon and unreacted titaniferous ore. The method comprises first moistening these residues with water and then treating them with hot water for a sufficient period of time to extract substantially all the vanadium into solution which is separated from insoluble material comprising carbon and unreacted titaniferous ore together with substantially all the niobium, tantalum and zirconium.

10 Claims, No Drawings

METAL EXTRACTION PROCESS

BACKGROUND OF THE INVENTION

The present invention relates to the hydrometallurgical extraction of metals, particularly vanadium, niobium, tantalum and zirconium, especially from ores, mineral concentrates and from certain industrial process residues in all of which these metals are associated with other metals. In some cases these other metals constitute undesirable impurities such as aluminum, silicon and iron and in others they constitute commercially valuable materials which are extracted along with vanadium or subsequently to the extraction of vanadium as, for example, in carnotite ores from which vanadium and uranium are co-extracted. In this application "industrial process residues" or simply "residues" refers to material remaining after extraction of a primary product in a chemical or hydrometallurgical process. Such residues may be treated as waste products of the process or they may be further extracted to recover one or more constituents of commercial value.

The present invention is especially, but not exclusively, applicable to the extraction of vanadium from residues obtained in the manufacture of titanium dioxide by the high temperature fluidized bed chlorination (so-called "chloride" processing) of titanium-containing ores such as rutile, ilmenite or leucoxene or ore preconcentrates such as so-called "upgraded ilmenite" or mixtures thereof. Since these ores and ore preconcentrates contain, in addition to titanium, several other elements such as vanadium, zirconium, niobium, tantalum, chromium, iron, aluminum and silicon, the presence of which would be undesirable in the titanium dioxide which is the primary product of the process, they have to be separated and are removed from the plant as residues. These residues also contain a comparatively small proportion of the titanium extracted in the process. Examples of such residues arising from the chlorination of rutile to produce titanium tetrachloride are given in U.S. Bureau of Mines Report of Investigation Nos. 7221 (1969) and 7671 (1972). The major components of the residue described are titanium as unreacted rutile and unrecovered titanium tetrachloride, carbon (coke) added in the chlorination process, and chlorine as metal chlorides. The impurity metals — vanadium, zirconium, niobium, iron, etc., are present in concentrated form in the residue remaining after distilling off the bulk of the titanium tetrachloride. A typical analysis of the residues appears in the following table:

TABLE I

|  | Percent By Wt. |
| --- | --- |
| V | 4.4 |
| Nb | 2.4 |
| Ta | 1.1 |
| Zr | 2.4 |
| Ti | 10.5 |
| Fe | 4.2 |
| Cr | 1.0 |
| Mn | .08 |
| Al | 2.2 |
| Cl | 26.0 |
| C | 33.0 |
| $SiO_2$ | 4.5 |

It will be noted that the remainder of such residues is combined oxygen and minor amounts of other metals.

The recovery of vanadium and niobium from such residues is a commercially desirable objective. Moreover, such residues are difficult to dispose of as waste material since they contain readily hydrolyzable chlorides which generate hydrochloric acid fumes on contact with moisture and also they contain toxic metals, notably vanadium. Thus the so-called "fuming" residues cannot conveniently be stored or dumped in the state in which they are obtained from the extraction process.

In U.S. Pat. No. 3,975,495 to Bowerman a process is described for recovering niobium and vanadium from a solution obtained by aqueous extraction of vanadiferous residues similar to those used in the process of the present invention. The process differs from that comprising the present invention in that it is necessary to separate the solution containing substantially all the vanadium, niobium and zirconium from the insoluble matter consisting of carbon and unreacted titaniferous ore and subsequently to effect a separation of niobium and zirconium by boiling in presence of sulfuric acid in order to precipitate these metals while leaving vanadium in solution, thus requiring a second liquid-solid separation step. In U.S. Pat. No. 3,975,495 it is shown that if the precipitation of niobium and zirconium is attempted without the addition of sulfuric acid, substantial proportions of the niobium and zirconium contents remain in the solution along with vanadium. In the process of the present invention, in contrast, virtually complete recovery of vanadium in solution is achieved substantially free from niobium and zirconium in a single process operation not requiring the addition of sulfuric acid.

As mentioned in British Patent Application No. 16102/75, residues from the chlorination of titaniferous ores can be neutralized with lime and water to make them suitable for transport and storage; the metal chlorides and hydroxychlorides present are then converted to water-insoluble hydroxides or hydrous oxides and the calcium chloride formed dissolves in the water. However in this neutralization it is difficult to avoid use of excess of lime over that stoichiometrically required for neutralization and the resulting solid product invariably contains calcium. The presence of calcium interferes with removal of vanadium from the residues.

An alternative way of rendering such residues nonfuming, known in the art, is simply to moisten such residues with a relatively small amount of water; for example, by spraying them with from 1% to about 10% weight of water, whereby the treated residue is converted to a nonfuming, free-flowing powder which is readily stored and transported for disposal.

SUMMARY OF THE INVENTION

It has now been found, surprisingly, that the solubilities in aqueous media of the various metal compounds in the water-treated powdered residue from the chlorination of titaniferous ores are different from those of the original residue and that the solubilities of the water-treated residues are such that metal values can be simply and economically recovered. Thus the vanadium, iron, aluminum and chromium compounds remain water-soluble but the titanium, niobium, tantalum and zirconium compounds become insoluble in hot water but soluble in strongly acid media. It is known that when such vanadiferous residues have not been moistened with water and are then treated with water to extract vanadium, substantially all the niobium, tantalum and zirconium is also extracted into the solution as might be expected. Even on boiling the solution only part of the niobium, tantalum and zirconium content is precipitated. The mechanism by which moistening the vanadiferous residues materially changes the solubilities of these metals is not fully understood but since the reaction appears to require the presence of both water and the water-insoluble carbon and titaniferous ore, it is postulated that niobium, tantalum and zirconium interact in some way with one another and with the carbon, possibly by some adsorptive mechanism.

According to one aspect of the invention, advantage is taken of this effect to separate essentially all of the vanadium from a water-moistened residue by treating the moistened residue with hot water whereby most of the vanadium is extracted while most of the zirconium, niobium, tantalum and titanium remains in the residue along with carbon and unreacted ore. The water used to extract vanadium from the moistened vanadiferous residues may, if desired, contain a small amount of sulfuric acid; for example up to 50 grams per liter, which may be beneficial in fully extracting the vanadium content of the residues. The use of substantially higher concentrations of sulfuric acid is undesirable if co-extraction of significant amounts of niobium, tantalum and zirconium with the vanadium is to be avoided.

It has been found that extraction of the treated residue with cold instead of hot water removes the greater part of the vanadium but a high proportion of the niobium and zirconium are also extracted. On the other hand, the use of hot water (or hot dilute sulfuric acid) allows efficient separation of the vanadium without simultaneous removal of niobium and zirconium.

Present experience indicates that a progressively increasing temperature of extraction with water gives a corresponding desirable decrease in the amount of niobium and zirconium removed with the vanadium. The use of water or dilute sulfuric acid at the highest practicable temperature (boiling at ambient pressure) is therefore preferred.

DETAILED DESCRIPTION

The present invention is especially useful in extracting vanadium from plant waste residues obtained by the chloride treatment of titaniferous ores such as rutile, ilmenite and leucoxene or ore concentrates such as upgraded ilmenite (hydrochloric acid leached ilmenite) as well as mixtures thereof. The wastes, known as "fuming solids", must first be converted to non-fuming form by moistening with water using a controlled quantity of water, which causes small amounts of hydrochloric acid and steam to evolve, resulting in a free-flowing powder which is non-fuming in the presence of moisture. In contrast, the process of the Bowerman patent requires the use of fuming solids and would be inoperative if pretreated solids were to be employed.

In carrying out the invention, the water-treated free-flowing residue is formed into a slurry with hot water or hot dilute sulfuric acid using sufficient liquid to form a mixture that is sufficiently fluid to be handled by conventional mixers and pumps. Preferably the proportion of aqueous medium to powdered residue is the minimum required to achieve effective extraction of virtually all of the vanadium values. This obviously will vary with the vanadium content of the residues which typically range between 0.2% to 10%, most frequently 0.5% to 7%, vanadium expressed as V on a weight basis. Generally the treated solids are formed into a slurry or suspension having a total solids content (dry weight basis) in the range of 10 to 40%, preferably 20 to 30%. The slurry may be prepared with the aqueous extractant at ambient temperature and subsequently heating the slurry. Alternatively the extractant may be preheated.

Sulfuric acid is preferably added to the water used for the first stage of the extraction when it is desired to effect near complete extraction of vanadium. For example, when residues have been allowed to age several weeks or more, boiling water alone may extract less vanadium (for example only 75 to 80%) than from fresh residues. Addition of small amounts of sulfuric acid restores the extraction efficiency to over 90%. Generally sufficient sulfuric acid is used to form an aqueous solution which is in the range of about 0.05 N to 1 N. Subsequent extraction may use hot water to which no sulfuric acid is added.

Extraction is conducted at a temperature between about 160° to 212° F. at atmospheric pressure. Single and multi-stage extraction may be employed. As mentioned, the use of progressively increasing temperature results in a decrease in the amount of niobium and zirconium removed, whereby it is preferable to use water at the boiling point at atmospheric pressure (or as close thereto as is feasible). In most cases, extraction will require between about 10 minutes to 24 hours. Usually about 15 minutes to 1 hour will suffice. It is usually desirable to extract essentially all (for example 98% or more) of the vanadium in order to render the remainder of the residues non-noxious. In some cases 90% extraction or even less will suffice.

Treatment with hot water and removal of the extract solution may be performed by conventional methods and using conventional equipment. A washing-type press filter or rotary vaccum filter may conveniently be used. It is generally desirable to wash the extracted residue at least once with boiling water to remove residual vanadium. The washings may be recycled to the next extraction.

The vanadium in the solution obtained from extraction may be recovered in solid form by various known methods such as oxidation and precipitation at a suitable pH, typically about 1.8. It has been found that oxidation followed by precipitation at pH 1.9 at about 190° to 212° F. from a solution containing 10 g./l. of vanadium gives a "red cake" which is easily separated by decanting or filtration.

Once the vanadium has been removed the remaining residue may be safely dumped because it is no longer particularly toxic. Alternatively the remaining residue may be treated by means such as extraction with concentrated hydrochloric acid to remove zirconium and niobium, together with soluble titanium, in order to recover some or all of these materials. When tantalum is present it will usually be extracted along with niobium.

The acid extraction to recover zirconium, niobium and/or tantalum may be performed with hydrochloric acid (e.g., of 5.5 N concentration). The acid extraction proceeds faster and more nearly to completion as the temperature is higher. Extraction is preferably followed by washing with more acid and then with water.

The acid used for extraction may be recovered by evaporation for recycling. Evaporation to a high concentration followed by cooling of the residual solution yields a water-soluble solid which may be further processed to separate the metals, particularly niobium and tantalum, contained therein. Aspects of the invention will be demonstrated by the following examples which are given for illustrative purposes.

EXAMPLE I

The residue obtained from extraction of titanium from rutile by the chloride process and treated with 10% water had the following metal analysis by weight:

|    | Percent |
|----|---------|
| V  | 4.0     |
| Nb | 2.2     |
| Ta | 1.0     |
| Zr | 2.2     |
| Ti | 9.5     |
| Fe | 3.8     |
| Cr | 0.95    |
| Mn | 0.07    |
| Al | 2.0     |

The residues contained about 40% (wt.) carbon and analyzed about 22% Cl. Of the titanium values, about 2.4% was soluble and 7.1% was insoluble (rutile).

Fifty g. samples of this residue were treated as below and the proportion of vanadium, niobium and zirconium extracted were measured by conventional analysis. These proportions are given in the following table.

TABLE II

|     |                                                                                          | V   | Nb (Percent Extracted) | Zr   |
|-----|------------------------------------------------------------------------------------------|-----|------------------------|------|
| (a) | Maintained between 200–212° F. at ambient pressure with 150 ml. water for 1 hour         | 95  | 0.7                    | 0.9  |
| (b) | Same as (a) but with 0.6 mole $H_2SO_4$ per mole $ZrO_2$ added to water                  | 100 | 0.5                    | 0.6  |
| (c) | Stirred with 500 ml. at about 60° F. for 1 hour                                          | 100 | 28.0                   | 36.0 |

It will be seen from these results that the use of hot water gives substantially complete removal of vanadium without simultaneous removal of niobium and zirconium. The presence of relatively small amounts of sulfuric acid in the hot water improved the selectivity of the extraction process.

EXAMPLE II

The procedure of Example I (a) was followed with the same water-treated residue except that a 200 g. sample of residue was treated with 600 ml. of water at 200° to 212° F. for one hour and washed with an equal volume of water at 200° to 212° F. The washings were used for extraction of a second 200 g. sample of residue. The water was drained from the sample by filtration using a washing-type filter process.

The residues were then boiled with 500 ml. of approximately 5.5 N hydrochloric acid and washed with an equal amount of hot 5.5 N hydrochloric acid and then with water.

The distribution of V, Nb and Zr in the filtrates obtained was as follows:

| Distribution of V            |            |         |
|------------------------------|------------|---------|
| Aqueous extract and washings | 90 to 95%  |         |
| HCl extract and washings     | 3%         |         |
| Residual solids (unextracted V) | 2%      |         |
| Distribution of Nb and Zr    | Nb         | Zr      |
| Aqueous extracts and washings | 0.5%      | 0.3%    |
| HCl extracts and washings    | 75–85%     | 75–85%  |
| Residual solids (unextracted Nb and Zr) | 14% | 11%   |

Treatment with hydrochloric acid thus achieved efficient extraction of the Nb and Zr from the residue after removal of V.

EXAMPLE III

One hundred 100 g. of treated residues used in the previous examples were extracted with water and then with acid as in Example II above except that a 100 g. sample was used and extracted with 200 ml water followed by washing with 180 ml. water. The subsequent acid extraction was carried out with 200 ml. of 5.5 N HCl and washing with 150 ml. of 5.5 N HCl. The extractions were carried out under reflux to conserve the extractant volume. The extractions were carried out for different times and the results were as follows:

| Aqueous extraction time | 15 min. | 30 min. | 60 min. |
|-------------------------|---------|---------|---------|
| % V extracted           | 98      | 100     | 95      |
| % Nb extracted          | 0.5     | 0.5     | 0.5     |
| % Zr extracted          | 0.5     | 0.5     | 0.5     |

The filter cake from the third extraction (1 hour) gave the following results on extraction with acid:

| Acid extraction time | 15 min.      | 30 min. | 60 min. |
|----------------------|--------------|---------|---------|
| % V extracted        | not measured |         | 1       |
| % Nb extracted       | 85           | 78      | 78      |
| % Zr extracted       | 76           | 97      | 79      |

It is evident from these results that the extraction is quite rapid and is substantially complete after 15 minutes. It was found that filtration was quite rapid but washing was slower.

Extraction of Nb and Zr with cold hydrochloric acid was found to be less complete and also gave filtration and washing rates which were considerably lower.

It was found that the presence of sulfuric acid in the water extraction stage did not affect subsequent extraction with hydrochloric acid.

In order to investigate the effect of the process on metals other than V, Nb and Zr, the solid residue after hot water and hydrochloric extraction was analyzed for Fe, Mn, Cr, V, Ti, Al, Nb, Zr and Ta and the water and acid filtrates were similarly analyzed. The results were as follows:

|                                          | Fe  | Mn   | Cr   | V   | Ti  | Al  | Nb  | Zr  | Ta  |
|------------------------------------------|-----|------|------|-----|-----|-----|-----|-----|-----|
| Residue before extraction, % Residue after | 3.8 | 0.07 | 0.95 | 4.0 | 9.5 | 2.0 | 2.2 | 2.2 | 1.0 |

|  | Fe | Mn | Cr | V | Ti | Al | Nb | Zr | Ta |
|---|---|---|---|---|---|---|---|---|---|
| extraction, %* | 0.19 | <0.01 | 0.01 | <0.2 | 14.8 | <0.2 | 0.6 | 0.5 | 0.3 |
| Aqueous extract g./l. | 13.8 | 0.26 | 3.7 | 12.2 | 0.2 | 6.2 | — | — | — |
| Acid extract g./l. | 0.02 | <0.01 | 0.18 | — | 5.0 | 0.07 | 4.3 | 4.6 | 1.9 |

*residue after aqueous and acid extractions, water washed and dried

It will be noted from these results that:

virtually all the Al, Fe, Mn and most of the Cr are removed in the extraction with water Ta and Ti are removed with the Nb in the acid extract the acid extract is substantially free of elements likely to interfere with liquid ion exchange separation of Nb and Ta.

EXAMPLE IV

Vanadiferous residues from chlorination of upgraded ilmenite (synthetic rutile) were moistened with 10% by weight of water and the moistened product was kept for several weeks before extraction. It was then extracted, first with hot water and then with 5.5 N HCl as in Example II. A similar experiment was carried out except that the first extraction was made with hot 0.3 N $H_2SO_4$ instead of with hot water. In each case the extracts were analyzed for V, Nb and Zr and the results were as follows:

|  | % V Extracted | % Nb Extracted | % Zr Extracted |
|---|---|---|---|
| Hot water extract | 70 | 2 | 2 |
| HCl extract | 29 | 80 | 82 |
| Residual solids | 1 | 18 | 16 |
| 0.3 N $H_2SO_4$ extract | 94 | 2 | 2 |
| HCl extract | 5 | 78 | 84 |
| Residual solids | 1 | 20 | 14 |

I claim:

1. A method for recovering vanadium from a waste vanadiferous residue resulting from the chlorination of a titaniferous ore or ore concentrate in the presence of carbon followed by distillation of titanium tetrachloride, resulting in a fuming residue solid, said fuming solid residue comprising vanadium chloride together with at least one chloride selected from the group consisting of niobium, tantalum, zirconium, titanium and mixtures thereof, at least one chloride selected from the group consisting of aluminum, iron, chromium and manganese, carbon and unreacted ore, said fuming solid residue having been moistened with a small amount of water to form a free-flowing nonfuming powder, which recovery method comprises: forming said moistened solid residue into a slurry with a material selected from the group consisting of water and aqueous sulfuric acid that is between 0.05 and 1 Normal, maintaining said slurry at elevated temperature for a time sufficient to extract substantially all of the vanadium into solution and separating said solution from the remainder which is an insoluble residue comprising carbon, unreacted titaniferous ore and substantially all of the niobium, tantalum, zirconium or titanium.

2. The method of claim 1 wherein said slurry is maintained at a temperature in the range of about 160° to 212° F. at atmospheric pressure to extract the vanadium.

3. The method of claim 1 wherein said slurry is maintained at a temperature in the range of about 160° to 212° F. at atmospheric pressure for about 10 minutes to 24 hours to extract the vanadium.

4. The method of claim 1 wherein aqueous sulfuric acid is employed in a first stage of extraction and additional vanadium is extracted with hot water in a subsequent stage.

5. The method of claim 1 wherein said fuming solid residue is moistened with water by spraying.

6. A method for recovering vanadium from a waste vanadiferous residue resulting from the chlorination of a titaniferous ore or ore concentrate in the presence of carbon followed by distillation of titanium tetrachloride, resulting in a fuming residue solid, said fuming solid residue comprising vanadium chloride together with at least one chloride selected from the group consisting of niobium, tantalum, zirconium, titanium and mixtures thereof, at least one chloride selected from the group consisting of aluminum, iron, chromium and manganese, carbon and unreacted ore, said fuming solid residue having been sprayed with from 1 to 10% by weight of water to form a free-flowing nonfuming powder, which recovery method comprises: forming said free-flowing nonfuming powder into a slurry with a material selected from the group consisting of water and aqueous sulfuric acid that is between 0.05 and 1 Normal, said slurry having a total solids content in the range of 10 to 40% by weight, maintaining said slurry at about 160° to 212° F. for a time sufficient to extract substantially all of the vanadium into solution and separating said solution from the remainder which is an insoluble residue comprising carbon, unreacted titaniferous ore and substantially all of the niobium, tantalum, zirconium or titanium.

7. The method of claim 6 wherein said waste residue contains between 0.2 to 10% vanadium, expressed as V on a weight basis.

8. The method of claim 6 wherein vanadium is extracted at a temperature in the range of 200° to 212° F. at atmospheric pressure.

9. The method of claim 6 wherein said insoluble residue that is separated from the solution containing extracted vanadium is treated with hydrochloric acid to extract zirconium, niobium or tantalum therefrom.

10. The method of claim 6 wherein aqueous sulfuric acid is employed in a first stage of extraction and additional vanadium is extracted with hot water in a subsequent stage.

* * * * *